Aug. 26, 1924.
J. H. YOUNG
1,506,401
TOOTHBRUSH
Filed Dec. 4, 1922
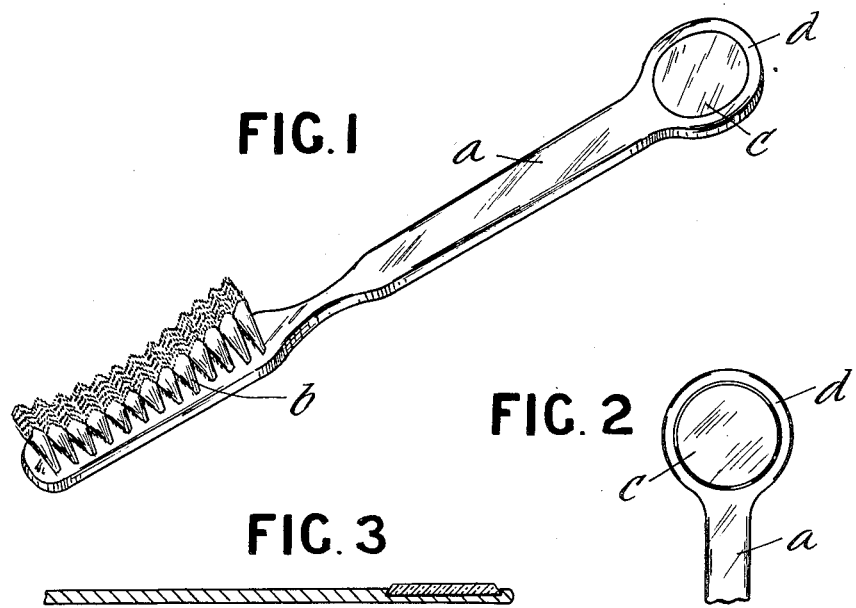
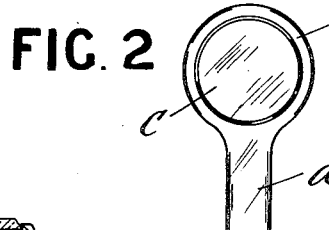
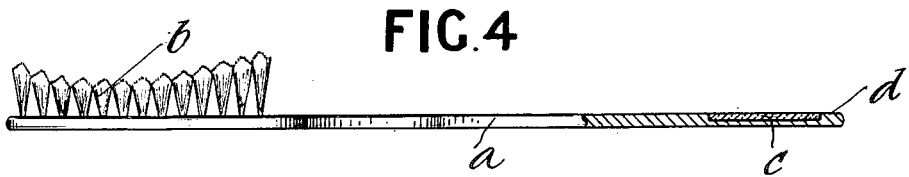
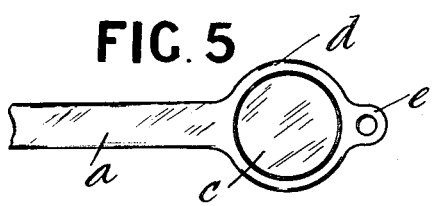
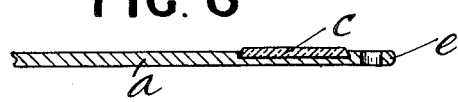
Inventor—
John Harry Young
By Kent W. Wonnell Atty.

Patented Aug. 26, 1924.

1,506,401

UNITED STATES PATENT OFFICE.

JOHN HARRY YOUNG, OF NORBURY, LONDON, ENGLAND.

TOOTHBRUSH.

Application filed December 4, 1922. Serial No. 604,659.

*To all whom it may concern:*

Be it known that I, JOHN HARRY YOUNG, British subject, of 60 Ederline Avenue, Norbury, London, S. W. 16, England, have invented certain new and useful Improvements in and Relating to Toothbrushes, of which the following is a specification.

This invention has reference to improvements in and relating to tooth-brushes, and has for its object the combination with the handle for the brush of a mirror adapted for use with the cooperation of the usual toilet mirror, when it is required to inspect the rear of the teeth or the back teeth in the jaws.

In the appended drawings—

Figure 1, is a perspective view of the improved tooth brush.

Figure 2, is a plan of the end of the handle thereof.

Figure 3, is a central longitudinal section of the handle portion.

Figure 4, is a part sectional view of a slight modification.

Figure 5, is a similar view to Figure 2 showing a modification.

Figure 6, is a sectional view of Figure 5.

In accordance with my invention, the tooth-brush may follow on known lines, and comprises an elongated handle $a$ carrying at one end the bristles $b$. On the other end of the handle, I provide a small mirror $c$, preferably on the same face as that on which the bristles are attached. This mirror $c$ which may be of silvered glass, or may comprise a disc or other piece of suitably polished metal, is preferably of circular shape, and the extremity of the handle is suitably enlarged, as at $d$, to receive the circular mirror.

The mirror may be cemented into a recess in the enlarged extremity, or the material of which the handle is made may be suitably moulded around the bevelled edge of the mirror to retain it in place.

If a mirror of other shape than circular is employed, I may form the end of the handle in which it is secured in a complementary fashion, i. e., if the mirror $c$ should be oval, the enlargement $d$ would be of oval form, or hexagonal if the mirror be cut hexagonal.

The mirror may project from the surface of the handle $a$, as in Figure 3, or may be flush therewith as in Figure 4. Further, a concave or convex mirror may replace the flat mirror.

In Figures 5 and 6 an extension $e$ beyond the enlargement $d$ is provided, and this is pierced with a hole so that the brush may be suspended in the known manner.

With the improved brush in use, when it is desired to inspect the teeth the mirror is placed at the rear of the teeth, and the image can be easily seen by reflection in any other mirror.

I claim:

A tooth brush comprising a narrow handle part with an enlargement at the outer end, a mirror secured in said enlargement, and a perforated lug projecting beyond said enlargement for suspending the handle part with the mirror face outward.

In testimony whereof I affix my signature.

JOHN HARRY YOUNG.